2,776,322

MANUFACTURE OF BETA-NAPHTHOL

William Webster and Denis Cheselden Quin, Epsom, England, assignors, by mesne assignments, to Hercules Powder Company, a corporation of Delaware No Drawing. Application September 27, 1949,
Serial No. 118,187

Claims priority, application Great Britain
October 30, 1948

3 Claims. (Cl. 260—621)

The present invention relates to the manufacture of beta-naphthol and, as intermediate product, beta-isopropyl naphthalene hydroperoxide.

The invention comprises oxidising beta-isopropyl naphthalene in the liquid phase with molecular oxygen to form beta-isopropyl naphthalene hydroperoxide, decomposing the hydroperoxide thus produced under the influence of acidic agents and recovering the beta-naphthol from the reaction mixture.

Larson, Thorpe and Armfield have shown in their study of the oxidation of hydrocarbons and of alkylated aromatics in Ind. Eng. Chem., vol. 34 (1942), pages 190 ff. that whilst secondary amyl benzene is oxidised readily by means of molecular oxygen at 130° C. (see Figure 8 on page 190), the absorption of oxygen by secondary amyl naphthalene at the same temperature is scarcely noticeable. The authors come to the conclusion that although naphthalene in general is more reactive than benzene in substitution reactions (sulphenation, nitration) and oxidation in the vapour phase, naphthalene derivatives in the liquid phase are more stable towards the action of molecular oxygen at elevated temperatures than the analogous benzene derivatives. They attribute this phenomenon to the formation of efficient oxidation inhibitors. It was, therefore, completely unexpected that when isopropyl naphthalene is exposed to the action of molecular oxygen at elevated temperatures, in the absence of heavy metal catalysts, oxidation takes place with ease, whereby isopropyl naphthalene hydroperoxide is formed.

The oxidation of the beta-isopropyl naphthalene may be carried out under ordinary or increase pressure at temperatures between 100° to 150°, preferably 110° to 135° C. The higher the temperature within the range indicated the speedier will be the oxidation. On the other hand, the maximum concentration of hydroperoxide obtained in the solution will decrease with an increase of the temperature, which is partly due to decomposition of the hydroperoxide taking place at the higher temperatures, partly to side reactions between the decomposition products and the hydroperoxide present.

The oxidation is effected preferably in the presence of some alkaline substance. Such alkaline substances are, for instance, alkali metal carbonates, such as sodium carbonate and potassium carbonate, alkali metal hydroxides, for instance sodium hydroxide or potassium hydroxide, or tertiary alkali metal phosphates. Sodium bicarbonate may also be used. If desired, further amounts of alkali may be added during the course of the oxidation reaction. In cases, however, where the temperature was less than 135° C. it was found that the speed of absorption of the oxygen is greatly accelerated by the addition to the alkali-containing reaction mixture of small quantities of water. The rate of absorption of oxygen by the reaction mixture remains fairly high from the commencement of the reaction, but the efficiency of the hydroperoxide production soon drops when a certain level of hydroperoxide content in the mixture is reached. This level is, apparently, dependent on the nature of the alkali used and the temperature during the oxidation. After reaching the maximum hydroperoxide content reduction of the latter may occur during further introduction of oxygen due, apparently, to secondary reactions which take place in the reaction mixture.

The molecular oxygen may be in the form of air or of mixtures of oxygen with other inert gases or vapours, wherein the oxygen content is richer than in air, or of pure oxygen. As inert admixtures nitrogen, carbon dioxide, steam or the like may be used.

The oxidation of the beta-isopropyl naphthalene may be carried out batchwise or in a continuous manner. In the latter case it has been observed that the induction period which generally occurs in the former type of oxidation reactions is overcome, and the addition of peroxidic compounds which are known to facilitate and accelerate the oxidation reactions is obviated. Such peroxidic compounds may, however, be added at the beginning of the operation when working batchwise or in a continuous manner.

The reaction is advantageously effected in a mild steel vessel which is completely filled with the reaction mixture so that no continuous gas phase containing high amounts of oxygen in conjunction with vaporised hydrocarbon is formed which may give rise to explosions by virtue of their explosive composition.

A good dispersion of the molecular oxygen-containing gases in the liquid reaction mixture, by means of efficient agitation, has to be provided for. A convenient way of combining good agitation with the avoidance of a continuous gas phase is achieved by the use as reactor of a long, narrow tube, wherein, by turbulent flow of the liquid in conjunction with the gas, a good distribution of the latter in the liquid is achieved. Attached to the tube is a separator, into which the liquid with the gas which is under pressure in the coil is discharged under ordinary pressure, so that any explosive gas mixture which might be formed, is not under increased pressure, whereby the risks of explosion are minimised or avoided.

An alternative method of accomplishing the oxidation of beta-isopropyl naphthalene comprises subjecting a dispersion of said hydrocarbon in water to the action of molecular oxygen. The dispersion may be attained or improved by the presence of suitable dispersing agents, such as alkali metal stearates, oleates and lauryl sulphates. The pH value in the aqueous dispersion is maintained preferably at between 7.5 and 12 or more. If necessary further amounts of alkali may be added to the reaction mixture during the course of the reaction for this purpose. A convenient ratio between the liquid hydrocarbon and the aqueous phase may be two volumes of isopropyl naphthalene to 1-8 volumes of water. Good results may be obtained by using a ratio of one volume to 1-2 of water. When the oxidation is carried out in an aqueous dispersion it has been found that much higher hydroperoxide concentrations can be reached or maintained than with the oxidation in the homogeneous liquid phase. Thus, it is possible when carrying out the oxidation in the heterogeneous liquid phase as an oil-in-water dispersion to obtain hydroperoxide concentrations of 45 to 50% in the hydrocarbon phase, whilst the oxidation in the homogeneous liquid phase yields economically concentrations of 20 to 30% only. The temperature at which the oxidation in the heterogeneous liquid phase is conveniently carried out ranges between 70° C. and the boiling temperature of the water at the operating pressure, preferably between 80° and 90° C. at atmospheric pressure.

The oxidation in the aqueous dispersion may also be carried out batchwise or in a continuous manner and may be effected in the same kind of equipment as that described for the oxidation in the homogeneous liquid phase.

The bulk of the beta-isopropyl naphthalene hydroperoxide produced is contained in the oily layer as solution in unreacted isopropyl naphthalene which will separate from the aqueous phase on standing and can be parted therefrom by decantation. The oily layer may be subjected direct to the subsequent decomposition treatment with acidic substances in order to convert the hydroperoxide into beta-naphthol in accordance with the process of the invention, or the hydroperoxide may be isolated for instance in the shape of its alkali metal salt by treatment with a strong aqueous hydroxide solution of the corresponding alkali metal. The free hydroperoxide may be obtained from its alkali metal salt by acidifying its solution or suspension in water with a suitable acid such as carbon dioxide. A small amount of the hydroperoxide is dissolved in the alkaline aqueous layer from which it may be gained by acidifying the aqueous layer. It is preferred, however, to utilize said layer for the preparation of further dispersion charges or, when carrying out the process in a continuous way, recycling it to the oxidation process with fresh isopropyl naphthalene.

Beta-isopropyl naphthalene hydroperoxide has hitherto not been described in the literature. It is a white solid which, when recrystallised from petrol ether (B. P. 60° to 80° C.) and has M. P. 59° to 61° C.

There are not many references in the literature to beta-isopropyl naphthalene. Haworth, Letsky and Mavin, J. C. S. 1932, p. 1790, claim to have obtained pure beta-isopropyl naphthalene by the reaction of isopropyl bromide with naphthalene in the presence of aluminium chloride. They describe it as having a B. P. 130° to 135° C./12 mm. and yielding a picrate M. P. 93° to 95° C. Price and Ciskowski describe in J. A. C. S. 60, p. 2499, that they obtained beta-isopropyl naphthalene by the reaction of isopropyl alcohol and naphthalene using boron trifluoride as catalyst. They describe it as having a B. P. 265° to 270° C./760 mm. and $n_D^{20}=1.5775$. When a product obtained by the reaction of propylene on naphthalene in the presence of aluminium chloride and showing the above mentioned refractive index was subjected to the oxidation reaction, it was observed, however, that the oxygen absorption is slow and the conversion into hydroperoxide inefficient. By further purification of the product, which shows the above-named properties, by means of close fractional distillation, it was found that the bulk of the reaction product had a B. P. of 147.5° and 148.6° C./24.5 mm. while its refractive index was in the range of $n_D^{20}=1.5868$ to 1.5904 and proved to be a mixture of beta- and alpha-isopropyl naphthalene. Beta-isopropyl naphthalene of a high standard of purity can be obtained by crystallisation of such a mixture from alcohol at temperatures between $+10°$ and $-40°$ C. depending on the amount of alpha-isomer originally present and the amount of alcohol used. Very highly efficient fractional distillation may also serve the purpose.

Pure beta-isopropyl naphthalene was found to possess the B. P. 147.4° C./24.5 mm. and a refractive index $n_D^{20}=1.5867$. Higher refractive indices than this figure indicate the admixture of alpha-isopropyl naphthalene.

Beta-isopropyl naphthalene thus purified either by careful distillation or by crystallisation reacts readily with molecular oxygen when treated according to the oxidation processes described above. Its reaction with oxygen is not impaired by the presence of alpha-isopropyl naphthalene, when the mixture is not contaminated by inhibiting materials. The hydroperoxide of alpha-isopropyl naphthalene is also produced in such cases. Generally, from the point of view of obtaining, subsequently, beta-naphthol of high purity, it was found best to work with a beta-isopropyl naphthalene of a purity of at least 95%.

The second stage of the beta-naphthol production according to the present invention comprises reacting the hydroperoxide of beta-isopropyl naphthalene with an acidic material at an elevated temperature. Suitable acidic materials for decomposing the beta-isopropyl naphthalene hydroperoxide and the production thereby of beta-naphthol are, for instance, aqueous mineral acids such as sulphuric acid, phosphoric acid and the hydrogen halides such as hydrogen chloride or hydrogen bromide. Other acidic materials are organic acids such as acetic acid, chloro-acetic acid, trichloroacetic acid and the sulphonic acids of benzene homologues such as para toluene sulphonic acid. By means of these organic acids decomposition can be carried out in the substantial absence of water by dissolving the hydroperoxide in inert organic liquids such as hydrocarbons, for instance benzene, toluene, xylene or subjecting the solution of the hydroperoxide in unreacted isopropyl naphthalene coming from the oxidation reaction without any intermediate treatment to the action of said acidic materials.

Other acidic agents for the decomposition of the hydroperoxide in the desired sense, which will act in the substantial absence of water are inorganic compounds such as aluminium chloride, iron trichloride and boron trifluoride. When such compounds are added to solutions of the hydroperoxide in hydrocarbons such as unchanged beta-isopropylnaphthalene a reaction sets in with an increase of temperature and the decomposition with the formation of beta-naphthol proceeds. In certain cases it is even necessary to moderate the reaction by suitable cooling.

In the case of acetic acid being used as decomposition agent acetic acid itself may be used as solvent and/or diluent.

The decomposition may also be effected by the use as acidic material of regenerated hydrogen ion-exchange materials. Such materials are, for instance, sulphonated phenol-formaldehyde resins or sulphonated coals. A resin of the described kind is, for instance, the one known on the market under the registered trademark "Zeocarb Hit." Other materials of similar nature are acid treated activated clays such as fuller's earth.

Simultaneously with the formation of the beta-naphthol the isopropyl radical to which the hydroperoxide group had been attached is converted into acetone which is a valuable by-product of the reaction.

The decomposition by means of these acidic materials is carried out at elevated temperatures and may be carried out under pressure. The temperature at which the decomposition is effected may vary within wide limits. It was found that with low concentrations of acids the mixture is advantageously heated to boiling temperature. The time required for the substantially complete decomposition, which may require several hours, can easily be ascertained by analysis. By raising the concentration of the acid it is possible to reduce the time for the complete decomposition. With sulphuric acid, which is the preferred medium for the decomposition, concentrations of more than 15% by weight/volume, preferably of about 50% w./v. are used. With concentrations of more than about 20% of sulphuric acid and with aqueous hydrochloric acid of similar strength the decomposition is practically completed within a short time, when the temperature in the reaction mixture is maintained at between 20 and 80° C. The higher the concentration of the acid used, the lower may be the temperature for effecting the decomposition, whereby undesirable side reactions are largely avoided. The concentration of sulphuric acid, however, should not exceed substantially 70%, as greater concentrations very soon lead to strong discolouration of the reaction mixture, which indicates far-going condensation and other side reactions. The preferred temperatures with higher concentrations of the acids within the range indicated are between 30 and 60° C.

The decomposition of the hydroperoxide by means of acidic material of the described kind may be effected by reacting the hydroperoxide after it has been isolated from the reaction mixture in the form of the free hydroperoxide or of its alkali metal salt with a suitable acid. A convenient and economical way, however, of carrying out the decomposition comprises bringing the solution of the hydroperoxide in unreacted isopropyl naphthalene into contact with the acidic material employed for the decomposition without a previous separation of the peroxide. When aqueous acids or solid substances which are not dissolved are used as decomposing medium it is necessary to provide for efficient agitation. Organic acids, on the other hand, form a homogeneous mixture with the hydroperoxide solution in unchanged isopropyl naphthalene. When the hydroperoxide either as such or in the form of its alkali metal salt is reacted with the decomposing acid, care has to be taken that the mixture is efficiently cooled as the temperature tends to rise very suddenly.

The decomposition step may be carried out batchwise or in a continuous manner. For the latter purpose as well as in the oxidation step a long, narrow tube may be used with advantage. As reactor may also be used a vessel provided with efficient agitating means and attached thereto a decanter which allows the continuous separation and withdrawal of the oily layer from the aqueous acid when an aqueous acid has been used for the decomposition. In place of one single agitator vessel a number of such vessels may be arranged in series or cascades, the last being connected with a similar decanting device, as described above. When solid insoluble acid materials such as hydrogen ion exchange material are employed as decomposing agent, they are brought in intimate contact with the solution by using them in finely comminuted form and vigorous agitation. An alternative method consists in percolating the solution containing the hydroperoxide through a column or a tower packed with the acidic material and maintained at the reaction temperature.

When the decomposition of the hydroperoxide is carried out after the latter has been separated from unreacted beta-isopropyl naphthalene that is in the absence of hydrocarbons, and when aqueous acids have been used as decomposition agents, the beta-naphthol may be recovered from the reaction mixture by extracting the said mixture by means of a water-immiscible solvent for beta naphthol. When the solution of the hydroperoxide in unreacted isopropyl naphthalene has been subjected to the decomposition treatment with aqueous acids, the recovery of beta-naphthol may be effected by separating the oily layer from the aqueous layer by decantation, and subjecting the oily layer to fractional distillation advantageously under reduced pressure, or by converting the naphthol contained in the oily layer into its alkali metal salt by shaking with an aqueous alkali metal hydroxide solution, separating the aqueous layer containing the alkali metal salt of beta-naphthol in solution from the oily layer and acidifying or neutralizing the aqueous layer, whereby the beta-naphthol is precipitated. Any excess of acid in the filtered precipitate is preferably removed by washing for instance with a solution of carbonate or bicarbonate of soda or with water, since acid has a deleterious effect, if and when the beta-naphthol is distilled subsequently in order to purify it. The acetone which is formed simultaneously with the beta-naphthol may be recovered from the acid reaction mixture for instance by distillation and subsequent condensation. When the decomposition has been effected in the substantial absence of water in an organic medium for instance in unchanged beta-isopropyl naphthalene by means of an organic acid such as para-toluene sulphonic acid, or by means of a solid acidic material such as an hydrogen ion exchange material the recovery of the beta-naphthol may be achieved by subjecting the reaction mixture to fractional distillation, in the last case preferably after the solid material has been removed.

The following examples illustrate the way in which the different stages of the process of the invention may be carried out in practice.

*Example 1*

Oxygen was passed through a reaction vessel containing 170 grams (=1 mole) of purified isopropyl naphthalene (98% beta-isomer), 340 grams of water, 3.4 grams of sodium carbonate and 0.34 gram of stearic acid. The mixture was heated to 90° C. and stirred vigorously. The incoming and outgoing oxygen were measured. During the first two hours no absorption occurred but after this time slow absorption took place and gradually the rate of absorption increased until after 9 hours an almost steady absorption rate of about 1 litre/hour was obtained. After 15 hours the mixture had absorbed 9.45 litres of oxygen (N. T. P.) The isopropyl naphthalene layer contained isopropyl naphthalene hydroperoxide to the extent of 46% w./w. Thus, 78 grams of hydroperoxide had been produced from 9.45 litres of oxygen, that is an efficiency of 91.6% of the theoretical.

*Example 2*

100 grams of isopropyl naphthalene (containing 96.5% beta isomer and having a refractive index $n_D^{20}=1.5870$, 200 ccs. water, 2.0 grams of sodium hydroxide and .2 gram of stearic acid, were oxidised at an internal temperature of 90° C. After 18 hours a total of 5.03 litres of oxygen had been absorbed. The reaction mixture contained 43 grams of isopropyl naphthalene hydroperoxide, i. e. an efficiency of 95% of the theoretical.

*Example 3*

130 grams of isopropyl naphthalene (containing 94% beta isomer) were heated under vigorous stirring to an internal temperature of 125° C. Oxygen was passed through the reaction mixture whilst maintaining the above temperature. The absorption was very slow and after 6 hours only 0.406 litre of oxygen had reacted with the formation of 2.7 grams of hydroperoxide, corresponding to about 75% efficiency.

To the same weight of isopropyl naphthalene was added 1 gram of sodium carbonate and 1 gram of water. Oxygen was introduced at a temperature of 125° C. and this temperature maintained throughout the reaction. Absorption of the oxygen began immediately. After 5 hours 3.37 litres of oxygen had been absorbed and 27.4 grams hydroperoxide were formed corresponding to 90% efficiency. After 1 more hour absorption was 3.94 litres and 30 grams of hydroperoxide had been formed. The efficiency, therefore, had fallen to 84.5% of the theoretical.

*Example 4*

To 130 grams isopropyl naphthalene (98% beta isomer) were added 3 drops of 30% w./w. aqueous sodium hydroxide solution. The mixture was heated under vigorous stirring to an internal temperature of 110° C. and oxygen was passed through it. After 4 hours 1.83 litres of oxygen had been absorbed and 16.2 grams hydroperoxide had been formed. At this point the reaction slowed down and after 6¼ hours absorption had increased to only 2.10 litres. The addition of three more drops of 30% w./w. aqueous sodium hydroxide solution at this point caused an increase in the rate of absorption. After 10¼ hours absorption was 3.09 litres while 26.4 grams of peroxide had been produced. This corresponds to an efficiency of about 96% of the theoretical. A similar absorption of oxygen and production of hydroperoxide was obtained when instead of aqueous sodium hydroxide solution, aqueous potassium hydroxide solution was used.

*Example 5*

130 grams of isopropyl naphthalene were treated in the presence of 1 gram of anhydrous sodium bicarbonate at 145° C. with oxygen. The oxygen absorption was very fast from the beginning and in 45 minutes 1.15 litres of oxygen were absorbed with the formation of 9.9 grams hydroperoxide corresponding to an efficiency of 95%.

After 1 hour and 45 minutes 3.09 litres were absorbed. The peroxide production at this stage was 73% of the theoretical.

Example 6

To 100 cc. of 50% w./v. sulphuric acid were added 50 cc. of a solution of isopropyl naphthalene hydroperoxide in isopropyl naphthalene, which was obtained according to Example 1 and contained 41% w./w. of hydroperoxide. The mixture was heated for 2½ hours to 60° C. with vigorous agitation using a reflux condenser. After this time all the hydroperoxide had been decomposed. To the reaction mixture was then added, under cooling and with stirring, a solution of 60 grams of sodium hydroxide in 250 cc. of water. The mixture was then heated to boiling point and the acetone and a small amount of water distilled off. 4.69 grams of acetone or 79.5% of the theoretical yield was obtained. On cooling the alkaline solution was separated from the isopropyl naphthalene by decantation. On acidification with 25% hydrochloric acid beta naphthol was precipitated. After filtering, washing with cold water and drying 13.5 grams of crude dried beta naphthol were obtained; that is 92.5% of the theoretical. On distillation under reduced pressure it yielded beta naphthol with no trace of colour and of a melting point 121° C.

Example 7

To 100 cc. of 5 normal hydrochloric acid at 50° C. was added 50 cc. of a solution of 42% w./v. isopropyl naphthalene hydroperoxide in isopropyl naphthalene obtained as in Example 1. After a few minutes the internal temperature began to rise and cooling was necessary to maintain the temperature of 50° C. After 30 minutes all the hydroperoxide was decomposed. The aqueous layer was, after cooling, separated from the oily layer, the yield of acetone obtained as described in Example 6 was 4.9 grams, that is 81% of the theoretical. The beta naphthol was extracted from the isopropyl naphthalene layer with dilute aqueous sodium hydroxide solution and recovered by the procedure described in the previous example. 12.4 grams of crude dry product were thus obtained and a further 0.1 gram recovered from the hydrochloric acid layer from which naphthol crystallised out on standing. The total yield of crude dried beta naphthol was 83.5% of the theoretical.

Example 8

5 grams of isopropyl naphthalene hydroperoxide were warmed on the water bath with twenty cc. of 2 normal sulphuric acid at 80° C. After a few minutes a fairly vigorous reaction set in and the mixture darkened in colour. Heating was continued for 30 minutes and then the mixture was cooled and filtered. The brown solid obtained was extracted with dilute sodium hydroxide and filtered free from a small amount of resinous material. The filtrate was acidified with dilute hydrochloric acid and yielded 2.8 grams of crude, dry product, i. e. 79% of the theoretical.

Example 9

A solution of 100 cc. of 20% w./v. isopropyl naphthalene hydroperoxide in isopropyl naphthalene was heated to 100° C. and 0.2 g. para toluene sulphonic acid added. A moderately fast reaction took place and after 1 hour the decomposition had gone to completion. The acetone which was distilled out during the decomposition was obtained in 64% of the theoretical yield. The beta naphthol was extracted from the hydrocarbon with aqueous alkali and recovered by acidification etc. as in the previous examples. The yield of crude dried naphthol was 73% of the theoretical.

Example 10

To a well-stirred mixture of 100 cc. of isopropyl naphthalene and 2.0 g. ferric chloride at 80° C., was added during 15 minutes 100 cc. of a solution of 29% w./v. isopropyl naphthalene hydroperoxide in isopropyl naphthalene. The decomposition was quite rapid and was complete in 30 minutes. The yield of acetone was 77% and of beta naphthol 85% of theory.

We claim:

1. A process for the production of beta naphthol which comprises intimately contacting at an elevated temperature in the range of 110° to 135° C. and in the substantial absence of heavy metal oxidation catalysts beta isopropyl naphthalene in dispersion in a liquid aqueous phase at a pH of about 7.5 to 12 with molecular oxygen under increased pressure, separating the aqueous and oily phases, and intimately contacting the oily phase comprising beta isopropyl naphthalene hydroperoxide in solution in unreacted beta isopropyl naphthalene with an acidic material selected from the group consisting of mineral acids, organic acids, acid-treated activated clays, sulphonated coals, sulphonated phenol-formaldehyde resins, aluminum chloride, ferric chloride and boron trifluoride in the substantial absence of water.

2. A process according to claim 1 wherein the acidic material is an organic acid.

3. A process, according to claim 2, wherein the organic acid is para toluene sulphonic acid.

References Cited in the file of this patent

UNITED STATES PATENTS

| 2,548,435 | Lorand et al. | Apr. 10, 1951 |

FOREIGN PATENTS

| 610,293 | Great Britain | Oct. 13, 1948 |
| 629,429 | Great Britain | Sept. 20, 1949 |
| 996,425 | France | Aug. 29, 1951 |

OTHER REFERENCES

Larsen et al.: Ind. Eng. Chem., vol. 34, pp. 190–192 (1942).

Hock et al.: Ber. Deutschen Chem. Gesell., vol. 77, pp. 257–263 (1944).